United States Patent
Lu et al.

(10) Patent No.: US 12,395,210 B2
(45) Date of Patent: Aug. 19, 2025

(54) METHOD FOR DETERMINING TRANSMISSION CHANNEL, TRANSMISSION METHOD, APPARATUS, SYSTEM, DEVICE, AND MEDIUM

(71) Applicant: ZTE CORPORATION, Guangdong (CN)

(72) Inventors: Haitao Lu, Guangdong (CN); Lijun Yang, Guangdong (CN); Boqing Chen, Guangdong (CN); Lin Guo, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 233 days.

(21) Appl. No.: 18/034,606

(22) PCT Filed: Nov. 29, 2021

(86) PCT No.: PCT/CN2021/133887
§ 371 (c)(1),
(2) Date: Apr. 28, 2023

(87) PCT Pub. No.: WO2022/111676
PCT Pub. Date: Jun. 2, 2022

(65) Prior Publication Data
US 2023/0379016 A1    Nov. 23, 2023

(30) Foreign Application Priority Data
Nov. 30, 2020   (CN) .......................... 202011375210.0

(51) Int. Cl.
*H04B 7/0456* (2017.01)
*H04B 7/06* (2006.01)
*H04L 5/00* (2006.01)

(52) U.S. Cl.
CPC ............. *H04B 7/0456* (2013.01); *H04B 7/06* (2013.01); *H04L 5/0023* (2013.01)

(58) Field of Classification Search
CPC .......... H04B 7/04; H04B 7/0456; H04B 7/06; H04B 7/0617; H04B 7/063; H04B 7/06952; H04B 17/391; H04L 5/0023
See application file for complete search history.

(56) References Cited

U.S. PATENT DOCUMENTS

2018/0084532 A1* 3/2018 Prasad .............. H04L 25/03343
2018/0152229 A1   5/2018 Hafez et al.
(Continued)

FOREIGN PATENT DOCUMENTS

CN    109150257 A    1/2019
CN    109981153 A    7/2019
(Continued)

OTHER PUBLICATIONS

China Patent Office, Second Office Action (OA2) dated Oct. 9, 2024, for corresponding CN application No. 202011375210.0.
(Continued)

*Primary Examiner* — David B Lugo
(74) *Attorney, Agent, or Firm* — Li & Cai Intellectual Property (USA) Office

(57) ABSTRACT

A method for determining a transmission channel in a millimeter wave system, a signal transmission method, an apparatus for determining a transmission channel in a millimeter wave system, a signal transmission apparatus, a millimeter wave system, a computer device, and a computer readable medium, the method includes: constructing a beam spatial channel model of a millimeter wave system, wherein the beam spatial channel model uses a matrix with sparsity to represent sub-beams in the millimeter wave system, and elements in the matrix represent channel gains of respective
(Continued)

sub-beams in the millimeter wave system, respectively; acquiring a beam spatial channel matrix of a legitimate user in the beam spatial channel model; and using a sub-beam with concentrated energy in the beam spatial channel matrix of the legitimate user as a transmission channel.

12 Claims, 5 Drawing Sheets

(56) References Cited

U.S. PATENT DOCUMENTS

| | | | |
|---|---|---|---|
| 2022/0104204 A1* | 3/2022 | Kong | H04W 16/14 |
| 2022/0369111 A1* | 11/2022 | Xia | H04W 12/122 |

FOREIGN PATENT DOCUMENTS

| | | | |
|---|---|---|---|
| CN | 110113752 A | 8/2019 | |
| CN | 110518947 A | 11/2019 | |
| CN | 111431567 A | 7/2020 | |
| CN | 111614387 A | 9/2020 | |

OTHER PUBLICATIONS

European Patent Office, the Extended European Search Report dated Oct. 1, 2024, for corresponding EP application No. 21897176.0.

"Key Technologies and Network Deployment of 5G" issued on Aug. 31, 2019, p. 36.

"Fundamentals and Applications of the Internet of Things" issued on Aug. 31, 2019, p. 227.

Wenqian Wu et al., "Beam Domain Secure Transmission for Massive MIMO Communications," arxiv.org, Cornell University Library, issued on Jan. 9, 2018.

Chen Sun et al., "Beam Division Multiple Access for Massive MIMO Downlink Transmission," IEEE ICC 2015, issued on Sep. 9, 2015.

You Chen et al., "Beam-Domain Secret Key Generation for Multi-User Massive MIMO Networks," arxiv.org, Cornell University Library, issued on May 18, 2020.

WIPO, International Search Report issued on Jan. 27, 2022.

* cited by examiner

Noise power (dBm)

METHOD FOR DETERMINING TRANSMISSION CHANNEL, TRANSMISSION METHOD, APPARATUS, SYSTEM, DEVICE, AND MEDIUM

CROSS-REFERENCE TO RELATED APPLICATION

The present disclosure claims the priority of Chinese Patent Application No. 202011375210.0 filed to State Intellectual Property Office of the People's Republic of China on Nov. 30, 2020, titled "Method for Determining Transmission Channel, Transmission Method, Apparatus, System, Device, and Medium", the contents of which are incorporated herein by reference.

TECHNICAL FIELD

Embodiments of the present disclosure relate to, but are not limited to, the field of communication technologies, and in particular, to a method for determining a transmission channel in a millimeter wave system, a signal transmission method, an apparatus for determining a transmission channel in a millimeter wave system, a signal transmission apparatus, a millimeter wave system, a computer device, and a computer readable medium.

BACKGROUND

With the explosive growth of wireless communication data traffic, higher requirements are put forward for the network capacity of 5G (5th-Generation, the fifth-generation mobile communication technology) systems. The abundant spectrum resources available in millimeter waves (e.g., frequency ranges of 30-300 GHz) can free the current wireless systems from spectrum congestion and provide the high data traffic required for 5G wireless communications. While the system capacity grows, a large amount of private information is transmitted through the wireless communication systems. The open property of wireless channels and the radio characteristics of electromagnetic waves make the design of secure communication more difficult. Physical layer security pre-coding uses the inherent properties, such as temporal variation, uniqueness, and reciprocity, of wireless channels as well as the signal processing technology to maximize the difference between legal channels and eavesdropping channels, and provides high confidentiality performance for 5G communication systems in the sense of information theory.

In the existing artificial-noise-aided secure transmission scheme, the millimeter wave communication scenarios of single-antenna eavesdroppers with Multiple Input Single Output (MISO) are studied. In the case that the base station only has partial Channel State Information (CSI) of an eavesdropping channel, the millimeter wave channel of antenna domain is converted to a channel model of discrete angle domain. The base station sends information bearing signals and artificial noise simultaneously, pre-codes and distributes power to information signals and artificial noise simultaneously, and uses noise to worsen the eavesdropping channel. In the channel model of the discrete angle domain, the association between the eavesdropping channel and the propagation sub-path of the legitimate channel can be clearly observed. However, to minimize the secrecy outage probability under the limitation of the secrecy rate, the calculation for deriving the power allocation factor is complicated. Therefore, the existing artificial noise scheme needs to sacrifice part of the transmitting power for artificial noise, and the system secrecy capacity of the wireless communication system is low.

SUMMARY

In view of the above deficiencies in the related art, the present disclosure provides a method for determining a transmission channel in a millimeter wave system, a signal transmission method, an apparatus for determining a transmission channel in a millimeter wave system, a signal transmission apparatus, a millimeter wave system, a computer device, and a computer readable medium.

In a first aspect, an embodiment of the present disclosure provides a method for determining a transmission channel in a millimeter wave system including: constructing a beam spatial channel model of a millimeter wave system, wherein the beam spatial channel model uses a matrix with sparsity to represent sub-beams in the millimeter wave system, and elements in the matrix represent channel gains of respective sub-beams in the millimeter wave system, respectively; acquiring a beam spatial channel matrix of a legitimate user in the beam spatial channel model; and using a sub-beam with concentrated energy in the beam spatial channel matrix of the legitimate user as a transmission channel.

In an optional implementation, constructing the beam spatial channel model of the millimeter wave system includes: constructing a clustered channel model of the millimeter wave system, wherein the clustered channel model includes an antenna domain channel matrix of a legitimate user and an antenna domain channel matrix of an eavesdropper; calculating the beam spatial channel matrix of the legitimate user according to a unitary transformation matrix and the antenna domain channel matrix of the legitimate user; and calculating a beam spatial channel matrix of the eavesdropper according to the unitary transformation matrix and the antenna domain channel matrix of the eavesdropper, wherein the beam spatial channel model of the millimeter wave system includes the beam spatial channel matrix of the legitimate user and the beam spatial channel matrix of the eavesdropper.

In an optional implementation, using the sub-beam with concentrated energy in the beam spatial channel matrix of the legitimate user as the transmission channel includes: normalizing elements in the beam spatial channel matrix of the legitimate user and the beam spatial channel matrix of the eavesdropper; and comparing moduli of corresponding elements in the beam spatial channel matrix of the legitimate user and the beam spatial channel matrix of the eavesdropper, respectively, and determining a sub-beam corresponding to an element in the beam spatial channel matrix of the legitimate user which has a larger modulus than that in the beam spatial channel matrix of the eavesdropper, as the sub-beam with concentrated energy in the beam spatial channel matrix of the legitimate user.

In an optional implementation, determining the sub-beam corresponding to the element in the beam spatial channel matrix of the legitimate user which has a larger modulus than that in the beam spatial channel matrix of the eavesdropper, as the sub-beam with concentrated energy in the beam spatial channel matrix of the legitimate user includes: creating a sparse matrix $B[b_i]$; where $$b_i = \begin{cases} 1, & \text{if } h_{Db}(i) > h_{Eb}(i) \\ 0, & \text{else} \end{cases} \quad i = 0, 1, \ldots, N_t,$$

$h_{Db}(i)$ is a modulus of a corresponding element in the beam spatial channel matrix of the legitimate user corresponding to an i-th antenna, $h_{Eb}(i)$ is a modulus of a corresponding element in the beam spatial channel matrix of the eavesdropper corresponding to the i-th antenna, and $N_t$ is a number of antennas configured for a base station; and determining a sub-beam which corresponds to $b_i$ being 1 in the sparse matrix, as the sub-beam with concentrated energy in the beam spatial channel matrix of the legitimate user.

In a second aspect, an embodiment of the present disclosure further provides a signal transmission method including: determining a transmission channel in a millimeter wave system by using the method according to the first aspect; precoding an information bearing signal; and transmitting the precoded information bearing signal using the transmission channel.

In an optional implementation, the precoding is performed using maximum ratio transmission in the step of precoding the information bearing signal.

In a third aspect, an embodiment of the present disclosure provides an apparatus for determining a transmission channel in a millimeter wave system including: a construction module configured to construct a beam spatial channel model of a millimeter wave system, wherein the beam spatial channel model uses a matrix with sparsity to represent sub-beams in the millimeter wave system, and elements in the matrix represent channel gains of respective sub-beams in the millimeter wave system, respectively; an acquisition module configured to acquire a beam spatial channel matrix of a legitimate user in the beam spatial channel model; and a determination module configured to use a sub-beam with concentrated energy in the beam spatial channel matrix of the legitimate user as a transmission channel.

In a fourth aspect, an embodiment of the present disclosure provides a signal transmission apparatus including: a determination module configured to determine a transmission channel in a millimeter wave system by the method according to the first aspect; a precoding module configured to precode an information bearing signal; and a transmission module configured to transmit the precoded information bearing signal using the transmission channel.

In a fifth aspect, an embodiment of the present disclosure provides a millimeter wave system including: the apparatus for determining a transmission channel in a millimeter wave system according to the third aspect, the signal transmission apparatus according to the fourth aspect, a base station, and multiple antennas configured for the base station, wherein the base station transmits millimeter waves via the antennas.

In a sixth aspect, an embodiment of the present disclosure provides a computer device including: at least one processor; and a storage device stored at least one program therein; wherein, when the at least one program is executed by the at least one processor, the at least one processor implements the method for determining a transmission channel in a millimeter wave system according to the first aspect and the signal transmission method according to the second aspect.

In a seventh aspect, an embodiment of the present disclosure provides a computer readable medium storing a computer program therein, wherein the computer program, when executed, implements the method for determining a transmission channel in a millimeter wave system according to the first aspect and the signal transmission method according to the second aspect.

In the embodiments of the disclosure, a beam spatial channel model of a millimeter wave system is constructed, wherein the beam spatial channel model uses a matrix with sparsity to represent sub-beams in the millimeter wave system, and elements in the matrix represent channel gains of respective sub-beams in the millimeter wave system, respectively; a beam spatial channel matrix of a legitimate user in the beam spatial channel model is acquired; and a sub-beam with concentrated energy in the beam spatial channel matrix of the legitimate user is used as a transmission channel. By taking advantage of the sparsity of the beam spatial channel model, in the sub-beams of the beam spatial channel model, the sub-beams with poor propagation performance in the legitimate channel are discarded, and the sub-beams with concentrated energy are retained, so that the difference between the legitimate channel and the eavesdropping channel is increased, which improves the system secrecy capacity and the information security while there is no need to sacrifice part of the transmitting power for artificial noise.

DETAIL DESCRIPTION OF EMBODIMENTS

In order for those skilled in the art to better understand the technical solutions of the present application, detail description is made below in conjunction with the accompanying drawings.

The following will refer to the accompanying drawings to describe the exemplary embodiments more fully, but the exemplary embodiments may be embodied in different forms and should not be construed as limited to the embodiments described herein. Conversely, the embodiments are provided to make the present disclosure thorough and complete, and to enable those skilled in the art to fully understand the scope of the present disclosure.

In the absence of conflict, the embodiments of the present disclosure and the features in the embodiments may be combined with each other.

As used herein, the term "and/or" includes any and all combinations of one or more relevant enumerated items.

The terminology used herein is only used to describe specific embodiments, and is not intended to limit the present disclosure. As used herein, the singular forms "a" and "the" are also intended to include the plural, unless otherwise clearly indicated in the context. It will also be understood that, when the terms "including" and/or "consist of . . . " are used in this specification, it specifies the presence of said feature, entity, step, operation, element and/or component, but does not exclude the presence or addition of one or more other features, entities, steps, operations, elements, components and/or groups thereof.

Unless otherwise defined, all terms used herein (including technical and scientific terms) have the same meanings as those generally understood by those of ordinary skill in the art. It will also be understood that, such terms as those defined in commonly used dictionaries should be interpreted to have meanings consistent with their meanings in the context of the relevant art and the present disclosure, and will not be construed as having idealized or overly formal meanings, unless expressly so defined herein.

In view of the problems in the related art that the existing artificial noise scheme needs to sacrifice part of the transmitting power for artificial noise and the system secrecy capacity of the wireless communication system is low, the present disclosure provides a method for determining a transmission channel in a millimeter wave system, a signal transmission method, an apparatus for determining a transmission channel in a millimeter wave system, a signal transmission apparatus, a millimeter wave system, a computer device, and a computer readable medium.

Figure 1:
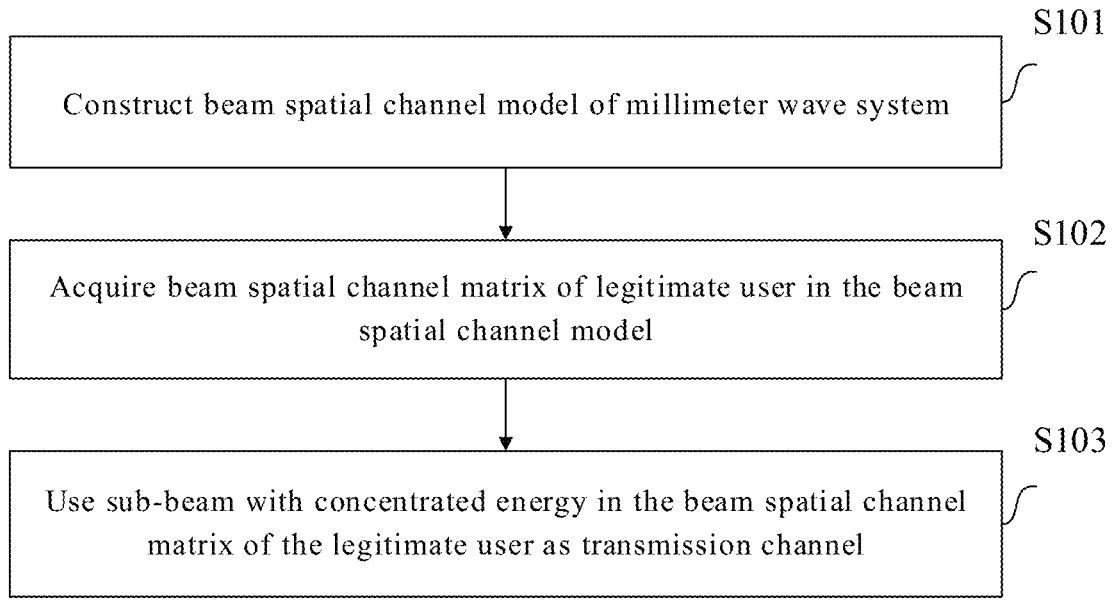
FIG. 1 is a flowchart of a method for determining a transmission channel in a millimeter wave system according to an embodiment of the present disclosure.

FIG. 1 shows a flowchart of a method for determining a transmission channel in a millimeter wave system according to an embodiment of the present disclosure. The method for determining a transmission channel in a millimeter wave system may be applied to an apparatus for determining a transmission channel in a millimeter wave system. As shown in FIG. 1, the method for determining a transmission channel in a millimeter wave system provided in this embodiment includes the following steps:

In Step S101, constructing a beam spatial channel model of a millimeter wave system;

In Step S102, acquiring a beam spatial channel matrix of a legitimate user in the beam spatial channel model; and In Step S103, using a sub-beam with concentrated energy in the beam spatial channel matrix of the legitimate user as a transmission channel.

Traditional secure pre-coding schemes, such as Maximum Ratio Transmission (MRT), aim the beam at legitimate users and reduce the received power of eavesdroppers. However, the maximum ratio transmission is for the independent and identically distributed Rayleigh fading channel, and does not take advantage of the sparse property of the millimeter wave channel.

The method for determining a transmission channel in a millimeter wave system provided in the present disclosure constructs a beam spatial channel model of a millimeter wave system. Herein, the beam spatial channel model uses a matrix with sparsity to represent sub-beams in the millimeter wave system, and elements in the matrix represent channel gains of respective sub-beams in the millimeter wave system, respectively. Since the sparsity of the beam spatial channel model is obvious, it is easier to distinguish the sub-beam with concentrated energy from other sub-beams. In other words, the beam spatial channel model easily reflects the difference between the sub-beam with better propagation performance and the sub-beam with poor propagation performance. The sub-beam with concentrated energy is selected to transmit signals so that the power difference between the transmission channel and the eavesdropping channel is large, and it is difficult to eavesdrop on the transmission channel, improving the system secrecy capacity of the channel and the information security while there is no need to sacrifice part of the transmitting power for artificial noise.

Figure 2:
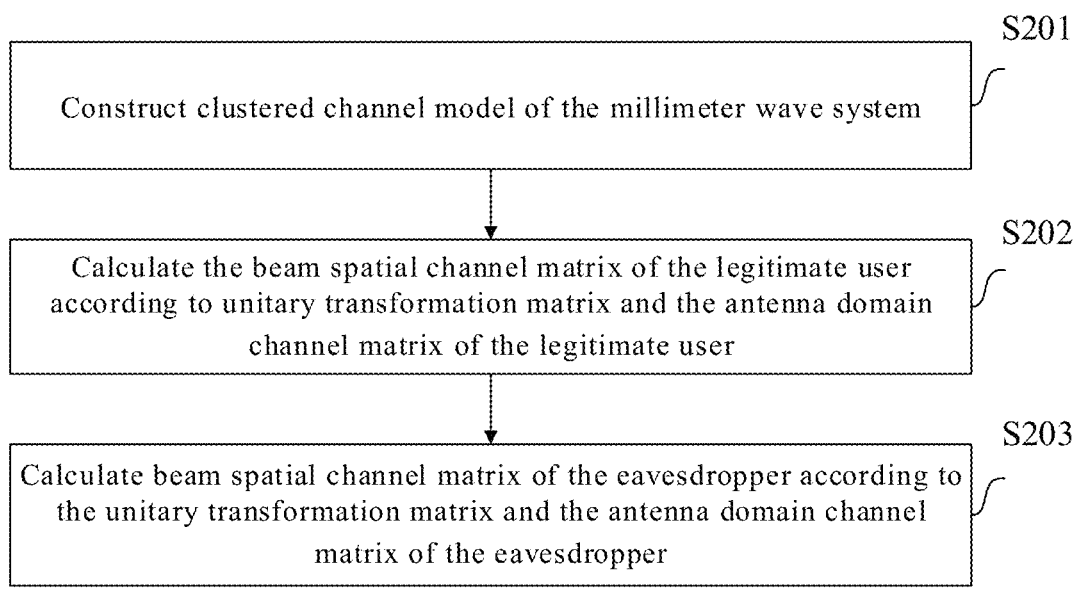
FIG. 2 is an optional implementation of Step S101 in FIG. 1 according to an embodiment of the present disclosure.

FIG. 2 shows an optional implementation of Step S101 in FIG. 1 according to an embodiment of the present disclosure. Further, as shown in FIG. 2, constructing the beam spatial channel model of the millimeter wave system includes:

Step S201, constructing a clustered channel model of the millimeter wave system.

Herein, the clustered channel model includes an antenna domain channel matrix of a legitimate user and an antenna domain channel matrix of an eavesdropper. In the studies of security pre-coding of millimeter wave wireless communication, due to the high path loss and limited scattering characteristics of millimeter wave transmission, the channels thereof no longer follow the traditional Rayleigh fading distribution, and the clustered channel model is usually used to construct millimeter wave channels.

Figure 5:
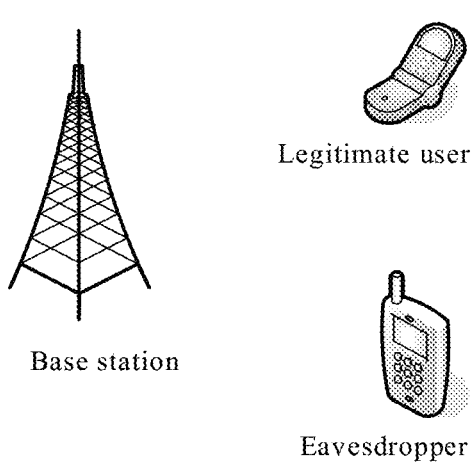
FIG. 5 is a schematic diagram of a base station transmitting millimeter waves according to an embodiment of the present disclosure.

Millimeter waves can provide greater bandwidth and system secrecy capacity for mobile communications. In the embodiment of the present disclosure, considering a single-user single-eavesdropper model, as shown in FIG. 5, the base station transmits millimeter waves, and the legitimate user and the eavesdropper receive millimeter waves the transmitted by the base station through different channels. The base station is equipped with $N_t$ antennas, and the legitimate user and eavesdropper each are equipped with 1 antenna. The channel matrix contains $N_{cl}$ scatter clusters, each containing $N_{ray}$ propagation paths. For a millimeter system, it is most likely to contain only 1 cluster, and most of the power is concentrated in a particular cluster. Thus, in the embodiment of the present disclosure, it is assumed that $N_{cl}=1$.

In this step, constructing the clustered channel model of the millimeter wave system includes:

creating the antenna domain channel matrix $$h_D = \sqrt{\frac{N_t}{N_{ray}}} \sum \alpha_{D1} a(\theta_{D1})^H$$

of the legitimate user; and creating the antenna domain channel matrix $$h_E = \sqrt{\frac{N_t}{N_{ray}}} \sum \alpha_{E1} a(\theta_{E1})^H$$

of the eavesdropper;

wherein the clustered channel model is a single legitimate user-single eavesdropper model, the legitimate user and eavesdropper each are equipped with 1 antenna, $N_t$ is the number of antennas that the base station is equipped with, the cluster contains $N_{ray}$ propagation paths, $\theta_{D1}$ is the angle of departure corresponding to the path gain of the legitimate user, $\alpha_{D1}$ is the path complex gain of the legitimate user, $\alpha_{D1} \sim CN(0, \sigma_{\alpha,i}^2)$, $\sigma_{\alpha,i}^2$ represents the average power in the i-th cluster, $\theta_{E1}$ is the angle of departure corresponding to the path gain of the eavesdropper and follows the Laplace distribution, and $\alpha_{E1}$ is the path complex gain of the eavesdropper. $a(\theta_{D1})$ represents the normalized array response vector corresponding to the angle of departure, and $a(\theta_{E1})$ is the array response vector corresponding to the angle of departure $\theta_{E1}$ in the 1-th path.

$$a(\theta) = \frac{1}{\sqrt{N_t}}\left[1, e^{jkd\sin(\theta)}, \ldots, e^{j(N_t-1)kd\sin(\theta)}\right]^T$$

where, $$k = \frac{2\pi}{\lambda},$$

and the relation between the antenna spacing and the wavelength of millimeter wave is $$d = \frac{\lambda}{2}.$$

Step S202, calculating the beam spatial channel matrix of the legitimate user according to a unitary transformation matrix and the antenna domain channel matrix of the legitimate user.

In this step, the beam spatial channel matrix of the legitimate user is calculated according to the following formula: $h_{Db} = h_D U_t$;

where, $U_t$ is the unitary transformation matrix and $$U_t = \frac{1}{\sqrt{N_t}}\left[a(\psi_0), a(\psi_1), \ldots, a(\psi_{N_t-1})\right],$$

$\psi_i$ is the angel of departure and $$\psi_i = \arcsin\left(\frac{\lambda i}{N_t d}\right), i = 0, 1, \ldots, N_t - 1,$$

$a(\psi_i)$ is the array response vector for each column, d is the antenna spacing, and $h_D$ is the antenna domain channel matrix of the legitimate user.

Step S203, calculating a beam spatial channel matrix of the eavesdropper according to the unitary transformation matrix and the antenna domain channel matrix of the eavesdropper.

The beam spatial channel matrix of the eavesdropper is calculated according to the following formula: $h_{Eb} = h_E U_t$;

where, $U_t$ is the unitary transformation matrix and $$U_t = \frac{1}{\sqrt{N_t}}\left[a(\psi_0), a(\psi_1), \ldots, a(\psi_{N_t-1})\right],$$

$\psi_i$ is the angel of departure and $$\psi_i = \arcsin\left(\frac{\lambda i}{N_t d}\right), i = 0, 1, \ldots, N_t - 1,$$

$a(\psi_i)$ is the array response vector for each column, d is the antenna spacing, and $h_E$ is the antenna domain channel matrix of the eavesdropper.

It should be noted that, the beam spatial channel model of the millimeter wave system includes the beam spatial channel matrix of the legitimate user and the beam spatial channel matrix of the eavesdropper. The beam spatial channel matrix can be obtained by performing unitary transformation on the antenna domain channel matrix, and the beam spatial channel matrix exhibits a sparse property.

Figure 3:
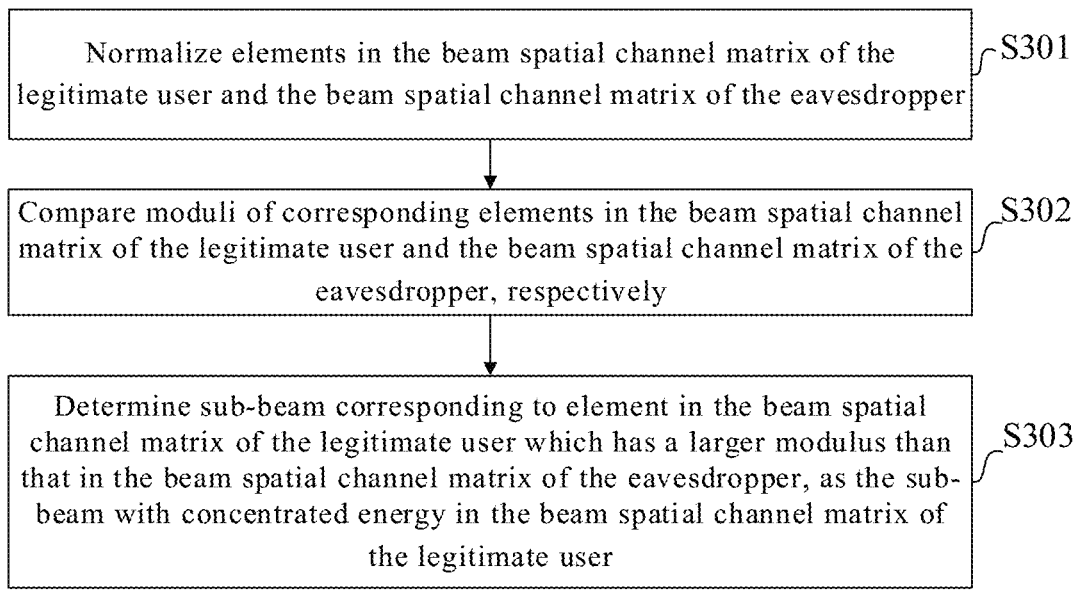
FIG. 3 is an optional implementation of Step S103 in FIG. 1 according to an embodiment of the present disclosure.

FIG. 3 shows an optional implementation of Step S103 in FIG. 1 according to an embodiment of the present disclosure. Further, as shown in FIG. 3, using the sub-beam with concentrated energy in the beam spatial channel matrix of the legitimate user as the transmission channel includes:

Step S301, normalizing elements in the beam spatial channel matrix of the legitimate user and the beam spatial channel matrix of the eavesdropper.

Figure 6:
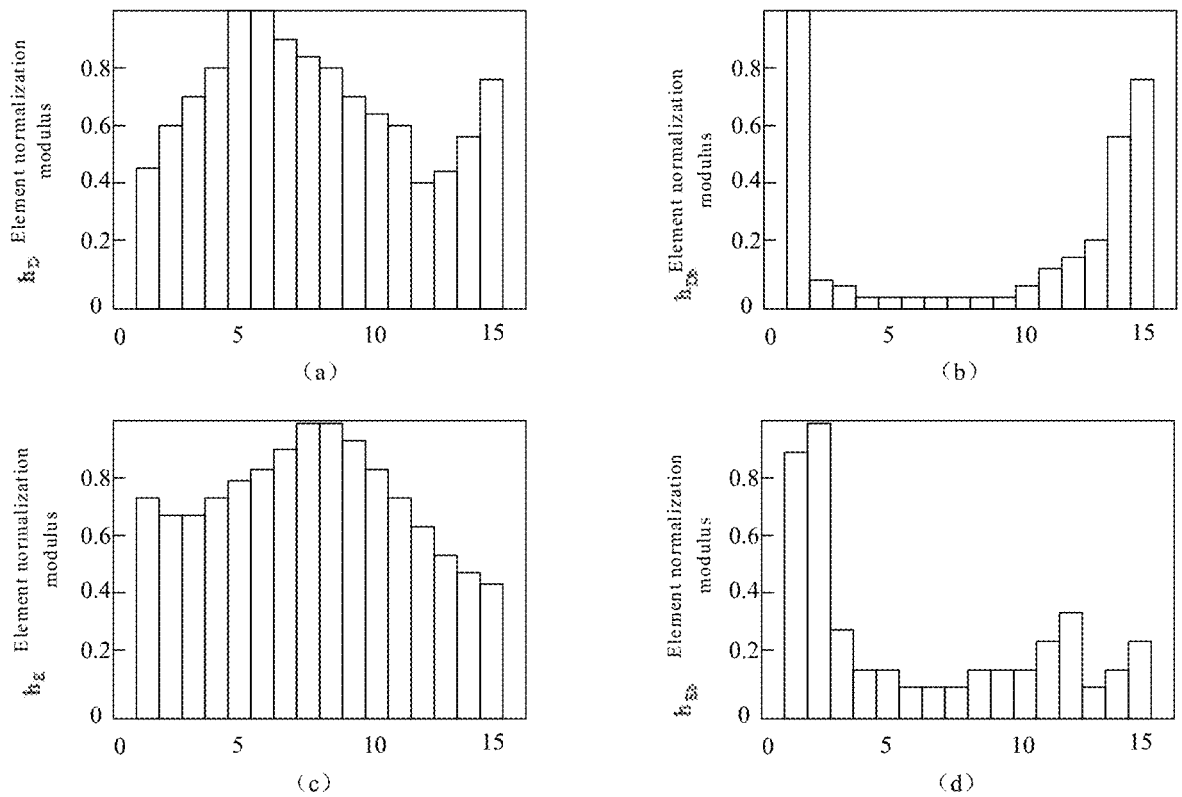
FIG. 6 is a schematic diagram of characterizing a beam spatial channel model according to an embodiment of the present disclosure.

Specifically, after unitary transformation, the beam spatial channel matrix of the legitimate user and the beam spatial channel matrix of the eavesdropper have sparsity. For example, as shown in FIG. 6, the sparsity of the beam spatial channel model after unitary transformation can be clearly reflected. Assuming that the base station is equipped with 16 antennas, there are 3 paths in a single cluster, the center angle of the angle of departure in the cluster is 0, and the angular spread $\sigma_{99} = 10°$, the legitimate channel and the eavesdropping channel in the antenna domain are simulated. The column vectors of the unitary matrix $U_t$ are:

$$a(\psi_i) = \frac{1}{\sqrt{16}}\left[1 \cdot e^{j2\pi i/16}, \ldots, e^{j15 \cdot 2\pi i/N_t}\right]^T, i = 0, \ldots, 15$$

According to the unitary matrix $U_t$, unitary transformation is performed on the antenna domain channel matrix $h_D$ of the legitimate user and the antenna domain channel matrix $h_E$ of the eavesdropper, respectively, to obtain the beam spatial channel matrix $h_{Db}$ of the legitimate user and the beam spatial channel matrix $h_{Eb}$ of the eavesdropper. After unitary transformation, the elements in the beam spatial channel matrix of the legitimate user and the beam spatial channel matrix of the eavesdropper are normalized.

In the subgraphs in FIG. 6, the horizontal axis is the index of channel matrix element, and the vertical axis is the normalization modulus of matrix element. $h_D$, $h_E$, $h_{Db}$, and $h_{Eb}$ are normalized, respectively, to obtain the subgraphs (a), (b), (c), and (d) in FIG. 6. The moduli of the antenna domain channel matrix $h_D$ of the legitimate user in FIG. 6(a) are relatively closer, and more than half of the element normalization moduli are greater than 0.5. In FIG. 6(b), only the moduli of the $1^{st}$, the $15^{th}$ and the $16^{th}$ elements among the elements of the beam spatial channel matrix are greater than 0.5, and the remaining elements are relatively small. Similarly, for the eavesdropper, in FIG. 6(d), the moduli of the $1^{st}$ and the $2^{nd}$ elements among the elements of the beam spatial channel matrix are greater, and the sparsity is verified. Here, the more base station antennas, the narrower the sub-beams are divided, and the easier it is to reflect the channel sparse property.

Step S302, comparing moduli of corresponding elements in the beam spatial channel matrix of the legitimate user and the beam spatial channel matrix of the eavesdropper, respectively.

Step S303, determining a sub-beam corresponding to an element in the beam spatial channel matrix of the legitimate user which has a larger modulus than that of the corresponding element in the beam spatial channel matrix of the eavesdropper, as the sub-beam with concentrated energy in the beam spatial channel matrix of the legitimate user.

In Step S302 to Step S303, the beam spatial channel model exhibits significant sparsity, and a small number of elements have a large modulus, that is, the power is concentrated on fewer sub-beams. The sub-beams corresponding to the elements in $h_{Db}$ which have a modulus greater than the modulus of the elements in $h_{Eb}$ are determined to be the sub-beams with concentrated energy in the beam spatial channel matrix of the legitimate user.

Figure 4:
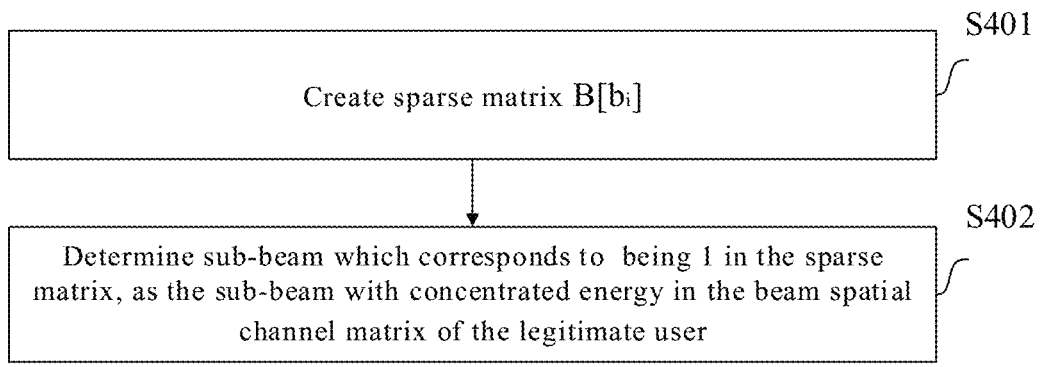
FIG. 4 is an optional implementation of Step S303 in FIG. 3 according to an embodiment of the present disclosure.

FIG. 4 shows an optional implementation of Step S303 in FIG. 3 according to an embodiment of the present disclosure. Further, as shown in FIG. 4, determining the sub-beam corresponding to the element in the beam spatial channel matrix of the legitimate user which has a larger modulus than that of the corresponding element in the beam spatial channel matrix of the eavesdropper, as the sub-beam with concentrated energy in the beam spatial channel matrix of the legitimate user includes:

Step S401, creating a sparse matrix $B[b_i]$.

where $$b_i = \begin{cases} 1, & \text{if } h_{Db}(i) > h_{Eb}(i) \\ 0, & \text{else} \end{cases} \quad i = 0, 1, \ldots, N_t,$$

$h_{Db}(i)$ is a modulus of a corresponding element in the beam spatial channel matrix of the legitimate user corresponding to an i-th antenna, $h_{Eb}(i)$ is a modulus of a corresponding element in the beam spatial channel matrix of the eavesdropper corresponding to the i-th antenna, and $N_t$ is a number of antennas configured for a base station.

Step S402, determining a sub-beam which corresponds to $b_i$ being 1 in the sparse matrix, as the sub-beam with concentrated energy in the beam spatial channel matrix of the legitimate user.

Figure 7:
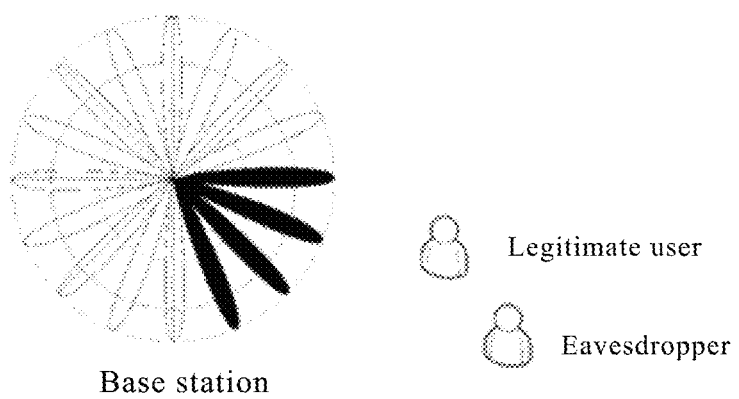
FIG. 7 is a schematic diagram of propagation of sub-beam selection of a beam spatial channel model according to an embodiment of the present disclosure.

In Step S401 to Step S402, the elements in corresponding positions in the normalized $h_{Db}$ and $h_{Eb}$ are compared, elements with larger moduli in $h_{Db}$ are retained, and elements in other positions are set to 0, thereby retaining the sub-beams with larger transmission power in the beam spatial channel matrix of the legitimate user and excluding the sub-beams of the eavesdropping channels with poor transmission power. For example, as shown in FIG. 6, the modulus of each vertical axis in FIG. 6(b) and the modulus of each vertical axis in FIG. 6(d) are compared, and only the moduli in $h_{Db}$ corresponding to the $1^{st}$, $14^{th}$, $15^{th}$, and $16^{th}$ sub-beams are greater than the respective moduli in $h_{Eb}$, and thus the corresponding $b_i$ is set to 1 and the remaining elements in the sparse matrix are set to 0. The sparse matrix created corresponding to FIG. 6 is B=[1,0,0,0,0,0,0,0,0,0,0, 0,0,1,1,1]. That is, only the $1^{st}$, $14^{th}$, $15^{th}$, and $16^{th}$ sub-beams of the legitimate channel are retained for data transmission, and the 12 relatively poor sub-beams of the legitimate channel are discarded. That is, in the beam spatial channel matrix of the legitimate user, the sub-beams with concentrated energy, i.e., the sub-beams with larger transmission power, are used as transmission channels. In FIG. 7, which shows a schematic diagram of propagation of the sub-beams of the beam spatial channel model, the shaded sub-beams are the selected sub-beams with concentrated energy in the beam spatial channel matrix of the legitimate user, and the data is transmitted on these four sub-beams.

Figure 8:
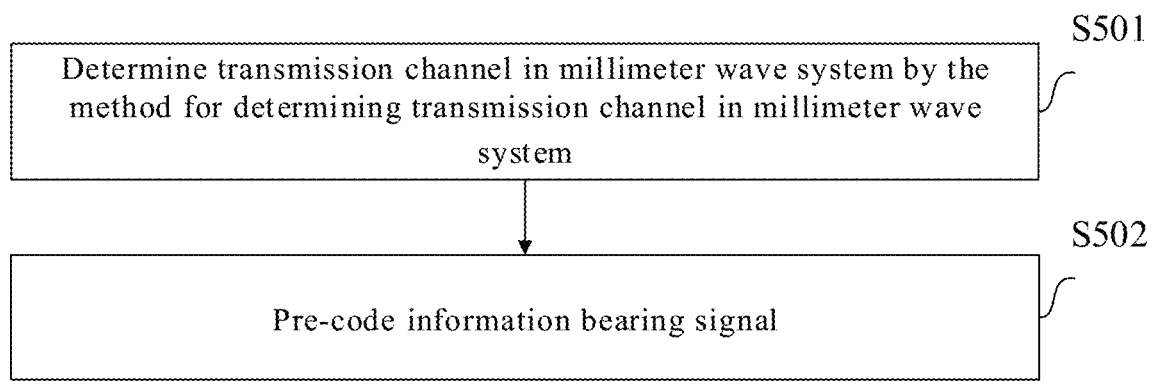
FIG. 8 is a flowchart of a signal transmission method according to an embodiment of the present disclosure.

FIG. 8 shows a flowchart of a signal transmission method according to an embodiment of the present disclosure. The signal transmission method may be applied to a signal transmission apparatus. As shown in FIG. 8, the signal transmission method in this embodiment includes the following steps:

Step S501, determining a transmission channel in a millimeter wave system by the method for determining a transmission channel in a millimeter wave system.

Step S502, precoding an information bearing signal.

Precoding technology is a technology that optimizes the power, rate and even transmitting direction for loading data streams by a certain preprocessing method, and it is possible to eliminate some or all of the interference between data streams in advance in the transmitter by preprocessing so as to obtain better performance. A precoding vector that maximizes the system secrecy capacity of the channel is selected, and the information bearing signal is multiplied by the precoding vector at the transmitter end to reduce the complexity and overhead that the receiver end needs to handle.

In this step, an equivalent legitimate channel matrix of the transmission channel is calculated according to the following formula: $\tilde{h}_D = h_{Db} * B * U_t^H$; where B is a sparse matrix, $U_t^H$ is a conjugate transpose matrix of the unitary transform matrix, and $h_{Db}$ is the beam spatial channel matrix of the legitimate user.

An equivalent eavesdropping channel matrix is calculated according to the following formula: $\tilde{h}_E = h_{Eb} * B * U_t^H$; where B is the sparse matrix, $U_t^H$ is the conjugate transpose matrix of the unitary transform matrix, and $h_{Eb}$ is the beam spatial channel matrix of the eavesdropper.

The power of the information bearing signal s meets $E[|s|^2]=1$, the transmission channel is precoded to ensure communication security, and the precoding vector can be set according to the following formula: $f = \tilde{h}_D^H / \|\tilde{h}_D\|$, to ensure that the signal-to-noise ratio of the received signal of the legitimate user is maximum. Herein $\tilde{h}_D$ is the equivalent legitimate channel matrix and $\tilde{h}_D^H$ is the conjugate transpose matrix of the equivalent legitimate channel matrix. Thus, the signal transmitted by the base station is x=fs, that is, the precoded information bearing signal.

Step S503, transmitting the precoded information bearing signal using the transmission channel.

Further, in the step of precoding the information bearing signal (i.e., Step S502), the precoding is performed using the maximum ratio transmission.

MRT precoding, also known as matched-filter precoding, is the simplest and easiest precoding algorithm, which is implemented by maximizing the received signal-to-noise ratio. MRT precoding maximizes the signal gain for the user on the receiver end so that optimal spectral efficiency and best signal transmission quality can be obtained with minimal complexity.

In the embodiment of the present disclosure, the sub-beams with concentrated energy in the beam spatial channel matrix of the legitimate user are selected, that is, the sub-beams with larger power are selected, and the inferior sub-beams are discarded, so as to obtain transmission channels suitable for signal transmission, increasing the difference between the transmission channel and the eavesdropping channel, improving the system secrecy capacity of the channel and the information security while there is no need to sacrifice part of the transmitting power for artificial noise. Furthermore, for the transmission channel after sub-beam selection, the maximum ratio transmission precoding is performed to maximize the total signal-to-noise ratio, and improve the system secrecy capacity compared with the traditional maximum ratio transmission. Therefore, the precoding method in the embodiment of the present disclosure does not need to sacrifice transmitting power for artificial noise, and can improve the system secrecy capacity to achieve the optimal system performance.

Specifically, in the simulation verification process, calculating the signal-to-noise ratio of the received signal of the legitimate user and the signal-to-noise ratio of the received signal of the eavesdropper includes the steps as follows, the embodiment of the present disclosure achieves the maximization of the signal-to-noise ratio of the received signal of the legitimate user by using the preset precoding vector f, and achieves the maximum ratio transmission precoding.

The received signal of the legitimate user and the received signal of the eavesdropper are calculated according to the following formula:

$$y_D = \tilde{h}_D f s + n_D,$$
$$y_E = \tilde{h}_E f s + n_E$$

where $y_D$ is the received signal of the legitimate user, $y_E$ is the received signal of the eavesdropper, $n_D$ and $n_E$ are additive white Gaussian noise and $n_D \sim CNs(0, \sigma_n^2)$, $n_E \sim CNs(0, \sigma_n^2)$, and fs is the preset base station transmitting signal, $f = \tilde{h}_D^H / \|\tilde{h}_D\|$.

The signal-to-noise ratio of the received signal of the legitimate user and the signal-to-noise ratio of the received signal of the eavesdropper are calculated according to the following formulas, respectively:

$$\xi_D = \frac{|\tilde{h}_D f|^2}{\sigma_n^2} = \frac{\|\tilde{h}_D\|^2}{\sigma_n^2}$$

$$\xi_E = \frac{|\tilde{h}_E f|^2}{\sigma_n^2} = \frac{|\tilde{h}_E \tilde{h}_D^H|^2}{\|\tilde{h}_D\|^2 \sigma_n^2};$$

where $\sigma_n^2$ is the power of the additive white Gaussian noise of the received signal, $\tilde{h}_D$ is the equivalent legitimate channel matrix, $\tilde{h}_D^H$ is the conjugate transpose matrix of the equivalent legitimate channel matrix, $\tilde{h}_E$ is the equivalent eavesdropping channel matrix, $\xi_D$ is the signal-to-noise ratio of the received signal of the legitimate user, and $\xi_E$ is the signal-to-noise ratio of the received signal of the eavesdropper.

Finally, the system secrecy capacity is the difference between the legitimate channel capacity $C_D$ and the eavesdropping channel capacity $C_E$, and if $C_D$ is greater than $C_E$, the system secrecy capacity is calculated according to the following formula: $C_s = [C_D - C_E] = [\log_2(1+\xi_D) - \log_2(1+\xi_E)]$; where $\xi_D$ is the signal-to-noise ratio of the received signal of the legitimate user, and $\xi_E$ is the signal-to-noise ratio of the received signal of the eavesdropper. In the present disclosure, the difference between $C_D$ and $C_E$ is increased, thus the system secrecy capacity is increased.

Figure 9:
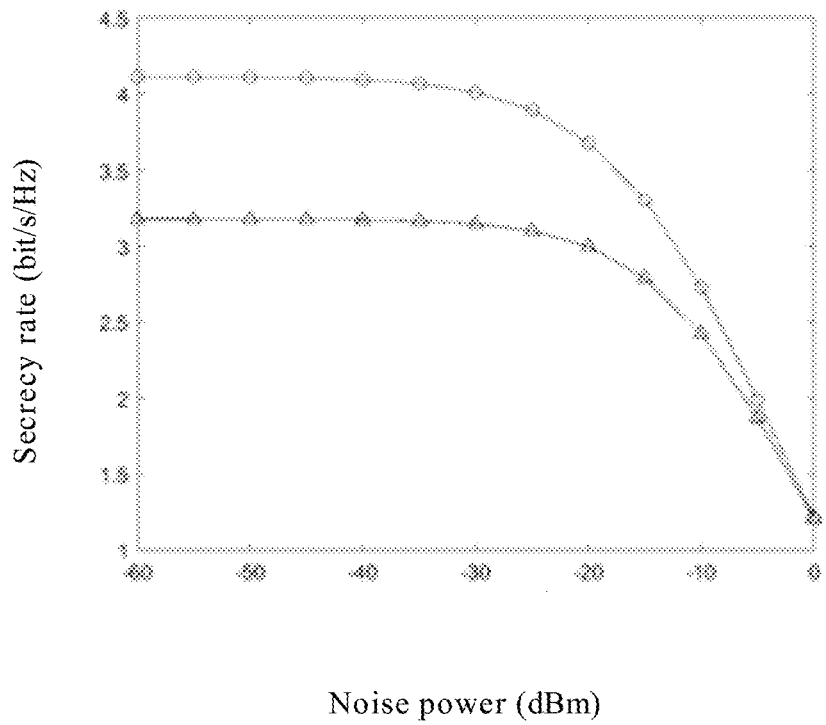
FIG. 9 is a schematic diagram of simulation of maximum ratio transmission pre-coding in a signal transmission method according to an embodiment of the present disclosure.

In addition, it should be noted that, compared with the traditional maximum ratio transmission scheme, the system secrecy capacity in the present disclosure is also improved. As shown in FIG. 9, in the single-user single-eavesdropper millimeter wave communication scenario, the maximum ratio transmission system secrecy capacity simulation analysis is performed on the transmission channel after sub-beam selection, and its advantages are compared with the traditional maximum ratio transmission scheme. The vertical axis in FIG. 9 is the secrecy rate, i.e., the system secrecy capacity, and the horizontal axis is the noise power. Assuming that the base station is equipped with 16 transmitting antennas, the legitimate users and eavesdroppers each are equipped with a single antenna. The millimeter-wave clustered channel model has a single cluster, there are 3 propagation paths in the cluster, its path gain $\alpha_l$ is independent and identically distributed and $\alpha_l \sim CN(0,1)$, l=1, 2, 3, the azimuth $\theta_l$ follows the Laplace distribution with a mean of 0 and a standard deviation of 10°, the information bearing signal meets $E[|s|^2]=1$, the power is 0 dBm, and the additive Gaussian white noise of different powers is used for simulation.

As can be seen from FIG. 9, compared with the system secrecy capacity of the traditional maximum ratio transmission scheme (the upper curve in FIG. 9), the system secrecy capacity in the present disclosure (the lower curve in FIG. 9) is improved. Because the sub-beam selection of the beam spatial channel model discards the beams with inferior propagation performance in the legitimate channel and retains the superior sub-beams, the difference between the legitimate channels and the eavesdropping channels increases, and the security is improved. Furthermore, the system secrecy capacity will be decreased with the increase of additive white Gaussian noise. When the noise power is close to the information bearing signal, the influence of noise on the system secrecy capacity is aggravated. At this time, the system secrecy capacity of the present disclosure is similar to that of the traditional maximum ratio transmission.

Figure 10:
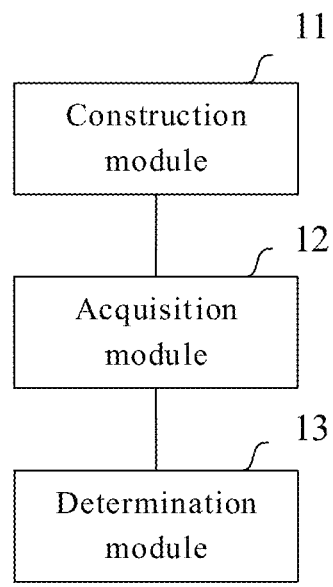
FIG. 10 is a schematic diagram of a structure of an apparatus for determining a transmission channel in a millimeter wave system according to an embodiment of the present disclosure.

FIG. 10 shows a schematic diagram of a structure of an apparatus for determining a transmission channel in a millimeter wave system according to an embodiment of the present disclosure. Based on the same technology concept as the embodiment corresponding to FIG. 1, as shown in FIG. 10, the apparatus for determining a transmission channel in a millimeter wave system according to the embodiment of the present disclosure includes the following modules:

a construction module 11 configured to construct a beam spatial channel model of a millimeter wave system, wherein the beam spatial channel model uses a matrix with sparsity to represent sub-beams in the millimeter wave system, and elements in the matrix represent channel gains of respective sub-beams in the millimeter wave system, respectively;

an acquisition module 12 configured to acquire a beam spatial channel matrix of a legitimate user in the beam spatial channel model; and a determination module 13 configured to use a sub-beam with concentrated energy in the beam spatial channel matrix of the legitimate user as a transmission channel.

The construction module 11 is specifically configured to:

construct a clustered channel model of the millimeter wave system, wherein the clustered channel model includes an antenna domain channel matrix of a legitimate user and an antenna domain channel matrix of an eavesdropper;

calculate the beam spatial channel matrix of the legitimate user according to a unitary transformation matrix and the antenna domain channel matrix of the legitimate user; and calculate a beam spatial channel matrix of the eavesdropper according to the unitary transformation matrix and the antenna domain channel matrix of the eavesdropper, wherein the beam spatial channel model of the millimeter wave system includes the beam spatial channel matrix of the legitimate user and the beam spatial channel matrix of the eavesdropper.

In some embodiments, the determination module 13 includes:

a processing sub-module configured to normalize elements in the beam spatial channel matrix of the legitimate user and the beam spatial channel matrix of the eavesdropper;

a comparison sub-module configured to compare moduli of corresponding elements in the beam spatial channel matrix of the legitimate user and the beam spatial channel matrix of the eavesdropper, respectively; and a determination sub-module configured to determine a sub-beam corresponding to an element in the beam spatial channel matrix of the legitimate user which has a larger modulus than that of the corresponding element in the beam spatial channel matrix of the eavesdropper, as the sub-beam with concentrated energy in the beam spatial channel matrix of the legitimate user.

In some embodiments, the determination sub-module is specifically configured to:

create a sparse matrix B[$b_i$]; where $$b_i = \begin{cases} 1, & \text{if } h_{Db}(i) > h_{Eb}(i) \\ 0, & \text{else} \end{cases} \quad i = 0, 1, \ldots, N_t,$$

$h_{Db}(i)$ is a modulus of a corresponding element in the beam spatial channel matrix of the legitimate user corresponding to an i-th antenna, $h_{Eb}(i)$ is a modulus of a corresponding element in the beam spatial channel matrix of the eavesdropper corresponding to the i-th antenna, and $N_i$ is a number of antennas configured for a base station; and determine a sub-beam which corresponds to $b_i$ being 1 in the sparse matrix, as the sub-beam with concentrated energy in the beam spatial channel matrix of the legitimate user.

Figure 11:
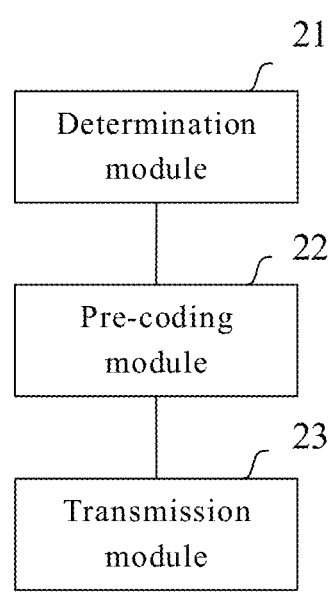
FIG. 11 is a schematic diagram of a structure of a signal transmission apparatus according to an embodiment of the present disclosure.

FIG. 11 shows a schematic diagram of a structure of a signal transmission apparatus according to an embodiment of the present disclosure. Based on the same technology concept as the embodiment corresponding to FIG. 8, as shown in FIG. 11, the signal transmission apparatus according to the embodiment of the present disclosure includes the following modules:

a determination module 21 configured to determine a transmission channel in a millimeter wave system by the method for determining a transmission channel in a millimeter wave system;

a precoding module 22 configured to precode an information bearing signal; and a transmission module 23 configured to transmit the precoded information bearing signal using the transmission channel.

In some embodiments, in the precoding module 22, the precoding is performed by using maximum ratio transmission.

An embodiment of the present disclosure further provides a millimeter wave system including the apparatus for determining a transmission channel in a millimeter wave system according to the aforementioned embodiments, the signal transmission apparatus according to the aforementioned embodiments, a base station, and multiple antennas configured for the base station, wherein the base station transmits millimeter waves via the antennas.

An embodiment of the present disclosure further provides a computer device, including: one or more processors; and a storage device stored one or more programs thereon; wherein, when the one or more programs are executed by the one or more processors, the one or more processors are caused to implement the methods for determining a transmission channel in a millimeter wave system according to the aforementioned embodiments and the signal transmission methods according to the aforementioned embodiments.

An embodiment of the present disclosure further provides a computer readable medium storing a computer program thereon, wherein, when the computer program is executed, it implements the methods for determining a transmission channel in a millimeter wave system according to the aforementioned embodiments and the signal transmission methods according to the aforementioned embodiments.

It will be appreciated for those of ordinary skill in the art that all or some of the steps in the methods disclosed above, functional modules/units in the devices may be implemented as software, firmware, hardware and appropriate combinations thereof. In hardware embodiments, the division between functional modules/units mentioned in the above description does not necessarily correspond to the division of physical components; for example, a physical component can have multiple functions, or a function or step can be performed by several physical components working together. Some physical components or all physical components may be implemented as software executed by a processor, such as a central processing unit, digital signal processor or microprocessor, or as hardware, or as an integrated circuit, such as an application-specific integrated circuit. Such software may be distributed on computer-readable media, which may include computer storage media (or non-transient media) and communication media (or transient media). As known to those of ordinary skill in the art, the term "computer storage media" includes volatile and non-volatile, removable and non-removable media implemented in any method or technique for storing information (such as computer-readable instructions, data structures, program modules or other data). The computer storage medium include, but are not limited to, RAM, ROM, EEPROM, flash memory or other memory technology, CD-ROM, digital multifunction disk (DVD), or other optical disk storage, magnetic cassette, tape, disk storage or other magnetic memory, or any other medium that may be used to store desired information and can be accessed by a computer. Further, it is well known for those of ordinary skill in the art that the communication medium typically includes computer-readable instructions, data structures, program modules, or other data in a modulated data signal such as a carrier or other transmission mechanism, and may include any information delivery medium.

Exemplary embodiments have been disclosed herein, and although specific terms are used, they are used for and should be interpreted as general illustrative meanings only, and are not intended for limiting purposes. In some examples, it is obvious to those skilled in the art that, unless expressly stated otherwise, the features, characteristics and/or elements described in conjunction with a particular embodiment may be used alone, or may be used in combination with other features, characteristics and/or elements described in conjunction with other embodiments. Accordingly, it will be appreciated for those of ordinary skill in the art that various forms and details may be modified without departing from the scope of the present application set forth by the appended claims.

What is claimed is:

1. A method for determining a transmission channel in a millimeter wave system, comprising:
   constructing a beam spatial channel model of a millimeter wave system, wherein the beam spatial channel model uses a matrix with sparsity to represent sub-beams in the millimeter wave system, and elements in the matrix represent channel gains of respective sub-beams in the millimeter wave system, respectively;
   acquiring a beam spatial channel matrix of a legitimate user in the beam spatial channel model; and
   using a sub-beam with concentrated energy in the beam spatial channel matrix of the legitimate user as a transmission channel;
   wherein constructing the beam spatial channel model of the millimeter wave system comprises:
   constructing a clustered channel model of the millimeter wave system, wherein the clustered channel model includes an antenna domain channel matrix of a legitimate user and an antenna domain channel matrix of an eavesdropper;
   calculating the beam spatial channel matrix of the legitimate user according to a unitary transformation matrix and the antenna domain channel matrix of the legitimate user; and
   calculating a beam spatial channel matrix of the eavesdropper according to the unitary transformation matrix and the antenna domain channel matrix of the eavesdropper, wherein the beam spatial channel model of the millimeter wave system includes the beam spatial channel matrix of the legitimate user and the beam spatial channel matrix of the eavesdropper.

2. The method according to claim 1, wherein using the sub-beam with concentrated energy in the beam spatial channel matrix of the legitimate user as the transmission channel comprises:
   normalizing elements in the beam spatial channel matrix of the legitimate user and the beam spatial channel matrix of the eavesdropper; and
   comparing moduli of corresponding elements in the beam spatial channel matrix of the legitimate user and the beam spatial channel matrix of the eavesdropper, respectively, and determining a sub-beam corresponding to an element in the beam spatial channel matrix of the legitimate user which has a larger modulus than that in the beam spatial channel matrix of the eavesdropper, as the sub-beam with concentrated energy in the beam spatial channel matrix of the legitimate user.

3. The method according to claim 2, wherein determining the sub-beam corresponding to the element in the beam spatial channel matrix of the legitimate user which has a larger modulus than that in the beam spatial channel matrix of the eavesdropper, as the sub-beam with concentrated energy in the beam spatial channel matrix of the legitimate user comprises:
   creating a sparse matrix $B[b_i]$;
   where $$b_i = \begin{cases} 1, & \text{if } h_{Db}(i) > h_{Eb}(i) \\ 0, & \text{else} \end{cases} \quad i = 0, 1, \ldots, N_t,$$

$h_{Db}(i)$ is a modulus of a corresponding element in the beam spatial channel matrix of the legitimate user corresponding to an i-th antenna, $h_{Eb}(i)$ is a modulus of a corresponding element in the beam spatial channel matrix of the eavesdropper corresponding to the i-th antenna, and $N_t$ is a number of antennas configured for a base station; and
   determining a sub-beam which corresponds to $b_i$ being 1 in the sparse matrix, as the sub-beam with concentrated energy in the beam spatial channel matrix of the legitimate user.

4. A signal transmission method, comprising:
   determining a transmission channel in a millimeter wave system by using the method according to claim 1;
   precoding an information bearing signal; and
   transmitting the precoded information bearing signal using the transmission channel.

5. The signal transmission method according to claim 4, wherein the precoding is performed using maximum ratio transmission in the process of precoding the information bearing signal.

6. An apparatus for determining a transmission channel in a millimeter wave system, comprising:
   a constructor configured to construct a beam spatial channel model of a millimeter wave system, wherein the beam spatial channel model uses a matrix with sparsity to represent sub-beams in the millimeter wave system, and elements in the matrix represent channel gains of respective sub-beams in the millimeter wave system, respectively;
   receiver configured to acquire a beam spatial channel matrix of a legitimate user in the beam spatial channel model; and
   a decision generator configured to use a sub-beam with concentrated energy in the beam spatial channel matrix of the legitimate user as a transmission channel;
   wherein the constructor is further configured to: construct a clustered channel model of the millimeter wave system, wherein the clustered channel model includes an antenna domain channel matrix of a legitimate user and an antenna domain channel matrix of an eavesdropper;
   calculate the beam spatial channel matrix of the legitimate user according to a unitary transformation matrix and the antenna domain channel matrix of the legitimate user; and
   calculate a beam spatial channel matrix of the eavesdropper according to the unitary transformation matrix and the antenna domain channel matrix of the eavesdropper, wherein the beam spatial channel model of the millimeter wave system includes the beam spatial channel matrix of the legitimate user and the beam spatial channel matrix of the eavesdropper.

7. A signal transmission apparatus, comprising:
   a decision generator configured to determine a transmission channel in a millimeter wave system by the method according to claim 1;
   a precoder configured to precode an information bearing signal; and
   a transmitter configured to transmit the precoded information bearing signal using the transmission channel.

8. A millimeter wave system, comprising an apparatus for determining a transmission channel in a millimeter wave system, the signal transmission apparatus according to claim 7, a base station, and multiple antennas configured for the base station, wherein the base station transmits millimeter waves via the antennas, wherein the apparatus for determining the transmission channel in the millimeter wave system, comprises:
a constructor configured to construct a beam spatial channel model of a millimeter wave system, wherein the beam spatial channel model uses a matrix with sparsity to represent sub-beams in the millimeter wave system, and elements in the matrix represent channel gains of respective sub-beams in the millimeter wave system, respectively;
receiver configured to acquire a beam spatial channel matrix of a legitimate user in the beam spatial channel model; and
a decision generator configured to use a sub-beam with concentrated energy in the beam spatial channel matrix of the legitimate user as a transmission channel.

9. A computer device, comprising:
at least one processor; and
a storage device for storing at least one program therein;
wherein, when the at least one program is executed by the at least one processor, the at least one processor implements the method for determining a transmission channel in a millimeter wave system according to claim 1.

10. A computer device, comprising:
at least one processor; and
a storage device for storing at least one program therein;
wherein, when the at least one program is executed by the at least one processor, the at least one processor implements the signal transmission method according to claim 4.

11. A non-transitory computer readable medium storing a computer program therein, wherein the computer program, when executed, implements the method for determining a transmission channel in a millimeter wave system according to claim 1.

12. A non-transitory computer readable medium storing a computer program thereon, wherein the computer program, when executed, implements the signal transmission method according to claim 2.

* * * * *